(12) United States Patent
Liu et al.

(10) Patent No.: US 7,421,200 B2
(45) Date of Patent: Sep. 2, 2008

(54) REDUCED LOSS ULTRA-FAST SEMICONDUCTOR MODULATOR AND SWITCH

(75) Inventors: Ansheng Liu, Cupertino, CA (US); Mario J. Paniccia, Santa Clara, CA (US); Haisheng Rong, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 572 days.

(21) Appl. No.: 11/007,858

(22) Filed: Dec. 9, 2004

(65) Prior Publication Data

US 2006/0126986 A1    Jun. 15, 2006

(51) Int. Cl.
*H04J 14/00* (2006.01)
(52) U.S. Cl. ...................................................... 398/45
(58) Field of Classification Search ................... 398/45, 398/140, 141; 359/237, 334; 385/1–3, 39
See application file for complete search history.

(56) References Cited

U.S. PATENT DOCUMENTS

| | | | | |
|---|---|---|---|---|
| 4,786,129 | A * | 11/1988 | Webb | 385/15 |
| 5,754,714 | A * | 5/1998 | Suzuki et al. | 385/5 |
| 5,920,666 | A * | 7/1999 | Digonnet et al. | 385/16 |
| 6,563,627 | B2 | 5/2003 | Yoo | |
| 6,674,773 | B1 | 1/2004 | Cotteverte et al. | |
| 6,999,670 | B1 | 2/2006 | Gunn, III et al. | |
| 2004/0090661 | A1 | 5/2004 | Nicolaescu | |
| 2006/0159382 | A1 | 7/2006 | Rong | |

FOREIGN PATENT DOCUMENTS

| | | |
|---|---|---|
| WO | WO 2006/028621 A2 | 3/2006 |
| WO | WO 2006/063348 A1 | 6/2006 |
| WO | PCT/US2005/027631 | 9/2006 |

OTHER PUBLICATIONS

Mizunami T. et al., "Short-Wavelength Stimulated Raman Scattering in a Silica Fiber Pumped by an XeBr Excimer Laser," IEEE Journal of Quantum Electronics, vol. 25, No. 8, pp. 1917-1920, Aug. 1, 1989.

(Continued)

*Primary Examiner*—Jason Chan
*Assistant Examiner*—Quan-Zhen Wang
(74) *Attorney, Agent, or Firm*—Blakely, Sokoloff, Taylor & Zafman LLP

(57) ABSTRACT

An optical modulator or switch is disclosed. An apparatus includes an optical splitter disposed in a semiconductor material that splits an optical beam having a first wavelength into first and second portions. The first and second portions of the optical beam are to be directed through first and second optical waveguides, respectively. The first optical waveguide is also optically coupled to receive a pump optical beam to amplify and phase shift the first portion of the optical beam. A diode structure is disposed in the first optical waveguide and is selectively biased to sweep out free carriers from the first optical waveguide generated in response to two photon absorption in the optical waveguide. An optical coupler is disposed in the semiconductor material and is optically coupled to the first and second optical waveguides to combine the first and second portions of the optical beam.

30 Claims, 8 Drawing Sheets

OTHER PUBLICATIONS

Claps R. et al., "Observation of stimulated Raman amplification in silicon waveguides," Optics Express, vol. 11, No. 15, pp. 1731-1739, Jul. 28, 2003.

Rong H. et al., "An All-silicon Raman laser," NATURE, vol. 433, No. 7023, pp. 292-294, Jan. 20, 2005.

U.S. Appl. No. 10/933,652, filed Sep. 2, 2004, Office Action, mailed Jan. 18, 2007.

PCT/US2005/044928; International Preliminary Report on Patentability: Jun. 27, 2007; 7 pages.

PCT/US2005/044928; International Search Report and Written Opinion; Apr. 27, 2006; 10 pages.

U.S. Appl. No. 11/337,214; Non-Final Office Action; mailed Jan. 17, 2007; 9 pages.

U.S. Appl. No. 11/337,214; Final OfficeAction; mailed Jun. 20, 2007; 9 pages.

* cited by examiner

REDUCED LOSS ULTRA-FAST SEMICONDUCTOR MODULATOR AND SWITCH

BACKGROUND OF THE INVENTION

1. Field of the Invention

Embodiments of invention relate generally to optical devices and, more specifically but not exclusively relate to semiconductor-based optical modulators and/or switches.

2. Background Information

The need for fast and efficient optical-based technologies is increasing as Internet data traffic growth rate is overtaking voice traffic pushing the need for fiber optical communications. Transmission of multiple optical channels over the same fiber in the dense wavelength-division multiplexing (DWDM) system provides a simple way to use the unprecedented capacity (signal bandwidth) offered by fiber optics. Commonly used optical components in the system include wavelength division multiplexed (WDM) transmitters and receivers, optical filter such as diffraction gratings, thin-film filters, fiber Bragg gratings, arrayed-waveguide gratings, optical add/drop multiplexers, lasers and optical switches. Optical switches may be used to modulate optical beams. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally relies upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate (LiNbO3).

Lithium niobate is a transparent material from ultraviolet to mid-infrared frequency range that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switches by external control circuitry.

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for providing a reduced loss ultra-fast semiconductor modulator and/or switch are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

Figure 1:
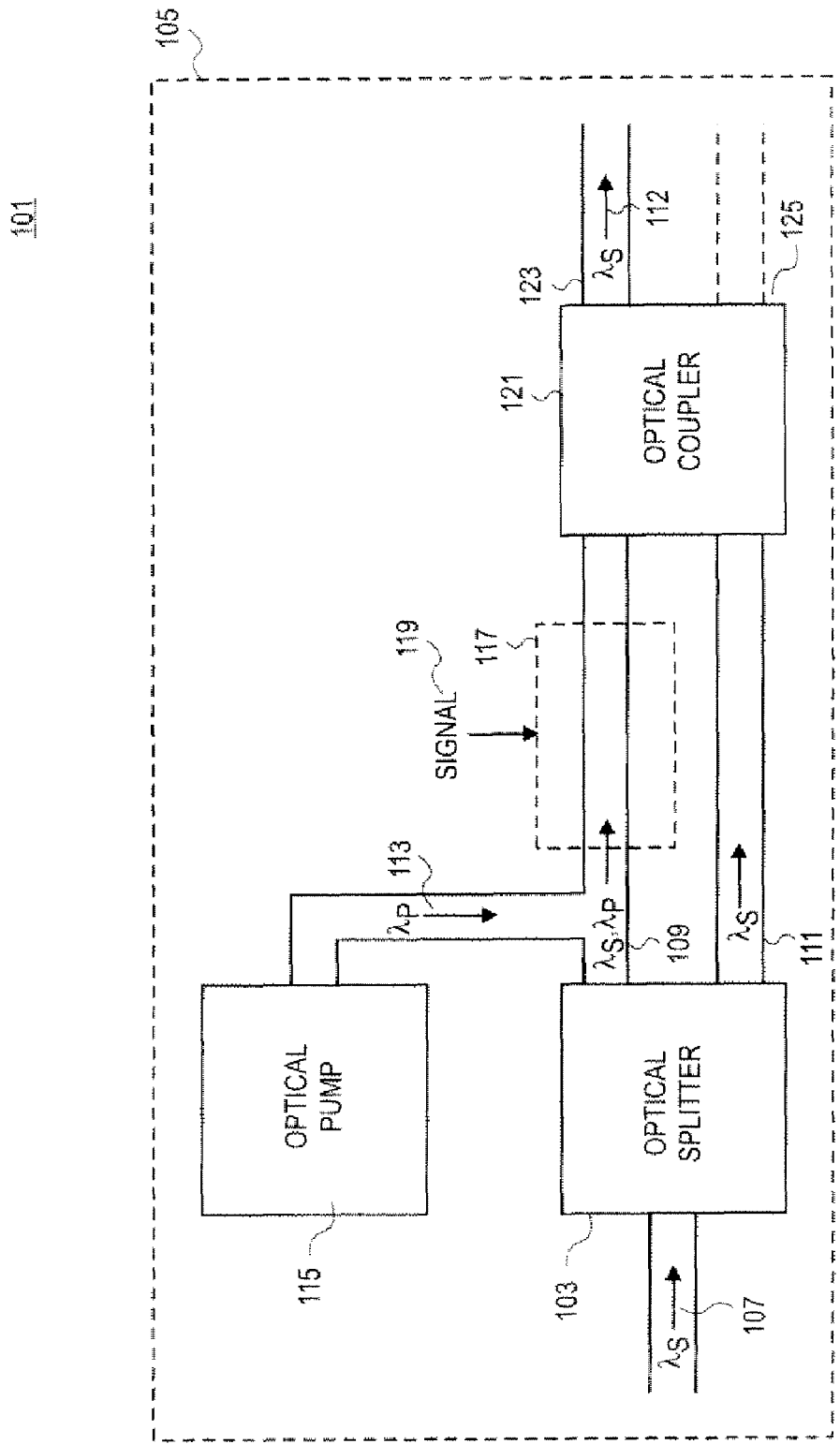
FIG. 1 is a block diagram illustrating a reduced loss ultra-fast semiconductor modulator or switch, according to an embodiment of the present invention.

FIG. 1 illustrates one embodiment of an optical device 101 including an optical splitter 103 disposed in semiconductor material 105 and optically coupled to receive an optical beam 107 having a first wavelength $\lambda_S$. In one embodiment, optical splitter 103 has two outputs to split optical beam 107 into first and second portions. As shown in the depicted embodiment, first and second optical waveguides 109 and 111 are disposed in the semiconductor material 105 and are optically coupled to the optical splitter 103 such that the first and second portions of optical beam 107 are to be directed through the first and second optical waveguides 109 and 111, respectively.

FIG. 1 also shows that one embodiment of optical waveguide 109 is optically coupled to receive a pump optical beam 113 having a pump wavelength $\lambda_P$, which in one embodiment is a different wavelength than first wavelength $\lambda_S$. For example, in one embodiment, pump wavelength $\lambda_P$ is a lower wavelength than first wavelength $\lambda_S$. In one embodiment, pump optical beam 113 has a sufficient pump power level to amplify and phase shift the first portion of optical beam 107 optical waveguide in response to stimulated Raman scattering (SRS). In the illustrated embodiment, optical beam 113 is received from an optical pump 115. In various embodiments, optical waveguide 109 may be optically coupled to receive pump optical beam 113 in a variety of different manners such as for example through an optical coupler, or for example as light incident on optical waveguide 109. The optical pump beam induces refractive index modulation and optical amplification or absorption of the first portion of the optical beam 107 in accordance with the teachings of the present invention.

As shown in the depicted embodiment, a diode structure 117 is disposed in semiconductor material 105 and included in optical waveguide 109. In one embodiment, the diode structure 117 is coupled to receive a signal 119 such that diode structure 117 is selectively biased in response to signal 119 to sweep out free carriers from optical waveguide 109 generated in response to two photon absorption in the optical waveguide 109 in accordance with the teachings of the present invention. In one embodiment, an optical coupler 121 is disposed in the semiconductor material 105 and is optically coupled to the first and second optical waveguides 109 and 111 to combine the first and second portions of optical beam 107. As a result, a Mach-Zehnder Interferometer (MZI) device is realized for an optical beam with wavelength $\lambda_S$ in accordance with the teachings of the present invention. In one embodiment, optical coupler 121 includes a single output 123, from which a modulated optical beam 112 is output. In one embodiment, the modulation of optical beam 112 output from the single output 123 of optical coupler 121 is in response to the signal 119. In this embodiment, optical device 101 functions as a reduced loss ultra-fast optical modulator in accordance with the teachings of the present invention. In another embodiment, optical coupler 121 includes a plurality of outputs 123 and 125. Optical beam 112 is selectively output from one of the plurality of outputs 123 or 125 in response to the signal 119. In this embodiment, optical device 101 functions as a reduced loss ultra-fast optical switch in accordance with the teachings of the present invention. Note that the optical coupler 121 may be designed differently for a modulator or a switch in accordance with the teachings of the present invention.

Figure 2:
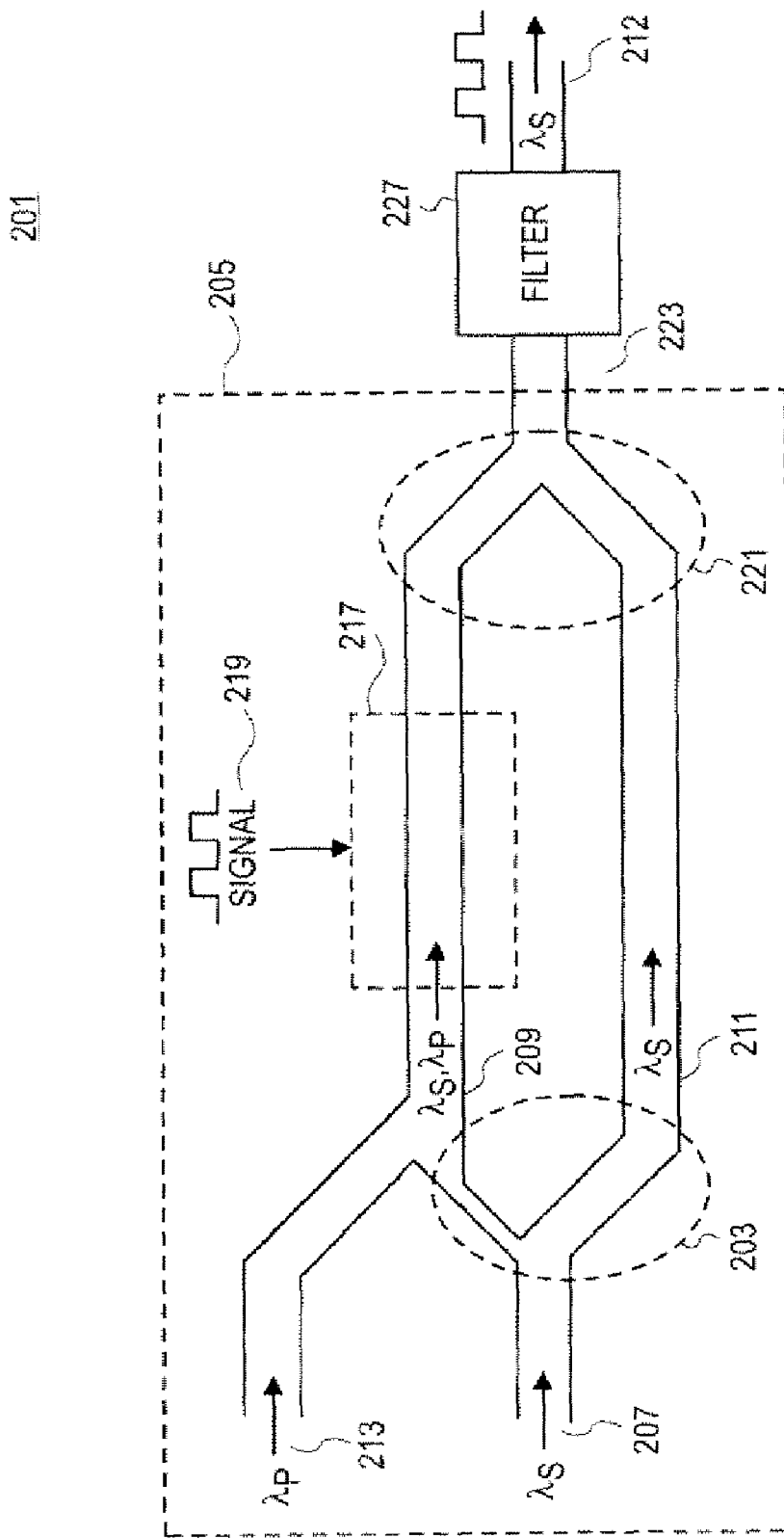
FIG. 2 is a block diagram illustrating another embodiment of a reduced loss ultra-fast semiconductor modulator in accordance with the teachings of the present invention.

FIG. 2 is a block diagram illustrating additional detail of one embodiment of a reduced loss ultra-fast semiconductor optical modulator 201 in accordance with the teachings of the present invention. As shown, optical modulator 201 includes an optical splitter 203 disposed in semiconductor substrate 205. Optical splitter 203 is coupled to receive an optical beam 207, which has a wavelength $\lambda_S$. Optical splitter 203 splits optical beam 207 into first and second portions. In one embodiment, optical splitter 203 is a Y-coupler that has two outputs coupled to first and second optical waveguides 209 and 211, respectively, in semiconductor material 205.

In the illustrated embodiment, the Y-coupler of optical splitter 203 has an unbalanced splitting ratio such that the optical power of the first portion of optical beam 207 output from optical splitter 203 into optical waveguide 209 is less than the optical power of the second portion of optical beam output from optical splitter 203 into optical waveguide 211. The splitting ratio of optical splitter 203 can vary in different embodiments depending on the SRS amplification that occurs in optical waveguide 209. For example, if the net gain of the amplification in optical waveguide is approximately 9.5 dB, the splitting ratio of optical splitter 203 is approximately 10%-90%, with 10% of optical beam 207 directed into optical waveguide 209 and 90% of optical beam 207 directed into optical waveguide 211.

As illustrated in the embodiment of FIG. 2, optical waveguide 209 is also coupled to receive pump optical beam 213. In one embodiment, pump optical beam 213 has a wavelength of $\lambda_P$. In accordance with the teachings of the present invention, pump optical beam 213 is an optical pump signal for use in generating spontaneous Raman scattering and amplifying the Raman signal of a selected frequency via stimulated Raman scattering (SRS). In particular, when SRS occurs in the medium, some of the energy of the pump signal is converted to light of a different frequency. This difference or shift in frequency is called the Raman frequency shift. In the illustrated embodiment, the power level of pump optical beam 213 is sufficient to cause further emission light having a wavelength $\lambda_S$, which is the same wavelength $\lambda_S$ of optical signal 207 and therefore results in the amplification of optical signal 207 in optical waveguide 209 in accordance with the teachings of the present invention.

A value for the SRS gain coefficient for a material pumped at a wavelength $\lambda_P$ can be found by Equation 1:

$$g = 16\pi^3 c^2 S/(h\omega_S^3 n_S^2 (N_0+1)\Gamma) \tag{1}$$

where S is the spontaneous Raman scattering coefficient (proportional to $\omega_S^4$), h is Planck's constant, $n_S$ is the refractive index of the waveguide core material at the Stoke's frequency, $\omega_S$ is the angular frequency of the Stokes emission, $N_0$ is the Bose factor and $\Gamma$ is one half the full width at half maximum of the Stokes line (in units of angular frequency). Equation 1 (due to the $\omega_S^4$ factor of S) shows that the gain coefficient is linearly dependent on the Stokes angular frequency.

In one embodiment, the wavelength $\lambda_S$ of optical beam 207 directed through optical waveguide 209 corresponds to a frequency substantially equal to the first order Stokes frequency of the pump optical beam 213 in accordance with the teachings of the present invention. Thus, pump optical beam 213 serves as a pump beam to induce Raman gain in optical waveguide 209 disposed in semiconductor material 205 and produces light amplification at $\lambda_S$. Therefore, the SRS gain or amplification can compensate for or offset the optical loss occurring in the MZI device due to for example waveguide roughness scattering, fiber to waveguide coupling, contact loss or the non-equal beam splitting of optical splitter 203 in accordance with the teachings of the present invention. Thus, in one embodiment, optical modulator 201 is an optical modulator that provides no loss, or even gain, depending on the optical power of pump optical beam 213 in accordance with the teachings of the present invention.

In one embodiment, semiconductor material 205 includes silicon. In the wavelength range of 1.3-1.6 µm for the optical communication band, silicon exhibits notable two-photon absorption (TPA), which is a third-order nonlinear optical effect. Generally, the linear absorption is negligible because the one-photon energy is smaller than the energy band gap of silicon. However, in the illustrated embodiment, the high optical pump intensity in for example continuous wave excitation, the TPA generates free carriers in silicon and consequently induces additional optical absorption for both the pump optical beam 209 having the optical wavelength $\lambda_P$ and optical beam 207 having the Raman wavelength $\lambda_S$. This in turn induces refractive index modulation and optical absorption of silicon due to free carrier plasma dispersion effect. The TPA-induced free carrier density depends on both the pump intensity and effective carrier lifetime according to Equation 2:

$$\Delta N = \frac{\beta \tau}{2h\nu} I^2 \qquad (2)$$

where $\Delta N$ is the carrier density, $\beta$ is the TPA coefficient, $h\nu$ is the one-photon energy for the pump beam, I is the pump intensity, and $\tau$ is the effective carrier lifetime. Therefore, one can modulate optical phase and net Raman gain of the portion of optical beam 207 propagating through optical waveguide 209 by modulating or controlling the free carrier lifetime or density of TPA induced free carriers or the pump intensity of pump optical beam 213 in accordance with the teachings of the present invention.

In one embodiment, diode structure 217 is included in optical waveguide 209 and is selectively biased to sweep out free carriers in optical waveguide 209 to vary or modulate the free carrier lifetime or density of free carriers in optical waveguide 209. In one embodiment, diode structure 217 includes a reverse biased p-i-n diode in optical waveguide to selectively modulate TPA induced free carrier density in optical waveguide in response to a signal 219. In so doing, the free carrier transit time or lifetime to cross the optical mode region in optical waveguide 209 determines the TPA-induced carrier density.

After the amplification and/or phase shifting of the portion of optical beam 207 in optical waveguide 209 due to SRS and the induced refractive index modulation and optical absorption of silicon due to free carrier plasma dispersion effect, the two portions of optical beam 207 are then combined in optical coupler 221. In the embodiment illustrated in FIG. 2, optical coupler is a 3-dB waveguide coupler disposed in semiconductor material 205 with a single output 223. The optical beam 212 output from single output 223 of optical coupler 221 is modulated in response to signal 219, which is applied to the diode structure 217 included in optical waveguide 209 in accordance with the teachings of the present invention. Therefore, in an embodiment in which data is encoded on signal 219, that data is encoded on the optical beam 212 that is output from optical coupler 221 at output 223. As shown in the embodiment of FIG. 2, an optical filter 227 may be optically coupled to the output 223 of optical coupler 221. In one embodiment, optical filter 227 blocks or filters out any residual light having the pump wavelength $\lambda_P$ from the output 223 of optical coupler 221. In various embodiments, optical filter 227 can be implemented using a variety of techniques such as for example Bragg gratings, dichroic coatings, or the like.

Figure 3:
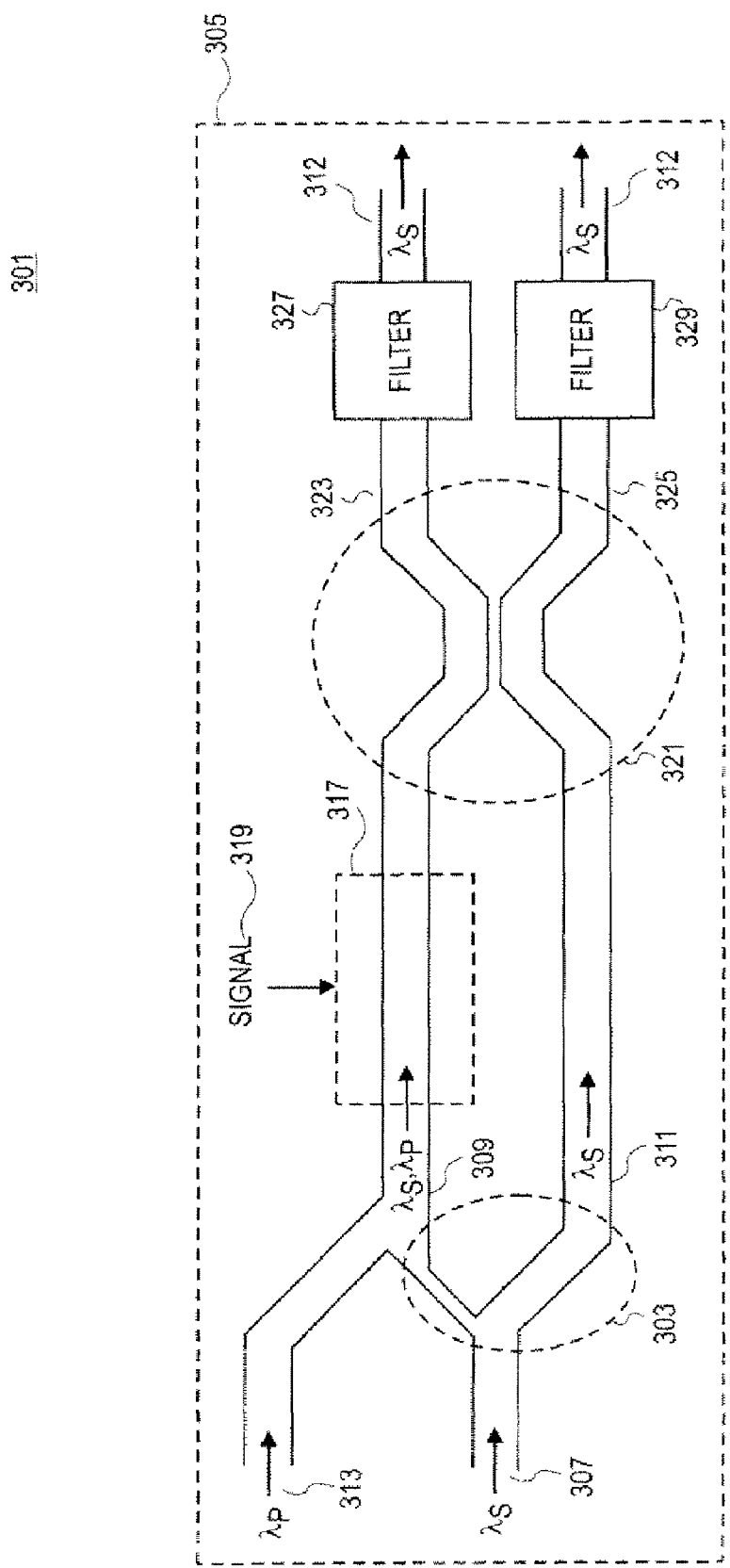
FIG. 3 is a block diagram illustrating another embodiment of a reduced loss ultra-fast semiconductor switch in accordance with the teachings of the present invention.

FIG. 3 is a block diagram illustrating additional detail of one embodiment of a reduced loss ultra-fast semiconductor optical switch 301 in accordance with the teachings of the present invention. As shown, optical switch 301 of FIG. 3 shares many similarities with optical modulator 201 of FIG. 2. One difference between optical switch 301 and optical modulator 201 is that optical coupler 321 of optical switch 301 includes more than one output 323 and 325, while optical coupler 221 of optical modulator 201 includes a single output 223. Therefore, in optical switch 301, signal 319 applied to diode structure 317 functions as a select signal to select which of the outputs 323 or 325 of optical coupler 321 from which optical beam 312 is output.

As shown, optical switch includes an optical splitter 303 disposed in semiconductor substrate 305. Optical splitter 303 is coupled to receive optical beam 307, which has a wavelength $\lambda_S$. Optical splitter 303 splits optical beam 307 into first and second portions, which are directed into first and second optical waveguides 309 and 311, respectively, in semiconductor material 305. In one embodiment, optical splitter 303 is a Y-coupler that has an unbalanced splitting ratio. Optical waveguide 309 is also coupled to receive pump optical beam 313 having a wavelength of $\lambda_P$ and having a power level sufficient to cause via SRS further emission of the portion of the optical beam 307 at wavelength $\lambda_S$ in optical waveguide 309. Thus, Raman amplification results in that portion of the optical beam 307. In addition, free carriers are generated in the optical waveguide 309 in response to TPA in optical waveguide 309 resulting form pump optical beam 313. In one embodiment, diode structure 317 is included in optical waveguide 309 and is selectively biased to sweep out free carriers in optical waveguide 309 to control or modulate the free carrier lifetime or density of free carriers in optical waveguide 309. Thus, amplification and/or phase shifting occurs in optical waveguide 309 in accordance with the teachings of the present invention.

After the amplification and/or phase shifting of the portion of optical beam 307 in optical waveguide 309, the two portions of optical beam 307 are then combined in optical coupler 321. In the embodiment illustrated in FIG. 3, optical coupler is a 2×2 coupler disposed in semiconductor material 305 with a plurality of outputs 323 and 325. The optical beam 312 is selectively output from one of the outputs 323 or 325 in response to select signal 319 in accordance with the teachings of the present invention. The output intensity at outputs 323 or 325 depends on the relative phase difference between the portions of optical beam 307 propagating through optical waveguides 309 and 311. Depending on the intensity or optical power of pump optical beam 313, optical switch 301 is an optical switch that provides no loss, or even gain, in accordance with the teachings of the present invention. As shown in the embodiment of FIG. 3, optical filters 327 and 329 are optically coupled to the outputs 323 and 325 of optical coupler 321 to block or filter out residual light having the pump wavelength $\lambda_P$ from the outputs 323 and 325 of optical coupler 321.

Figure 4:
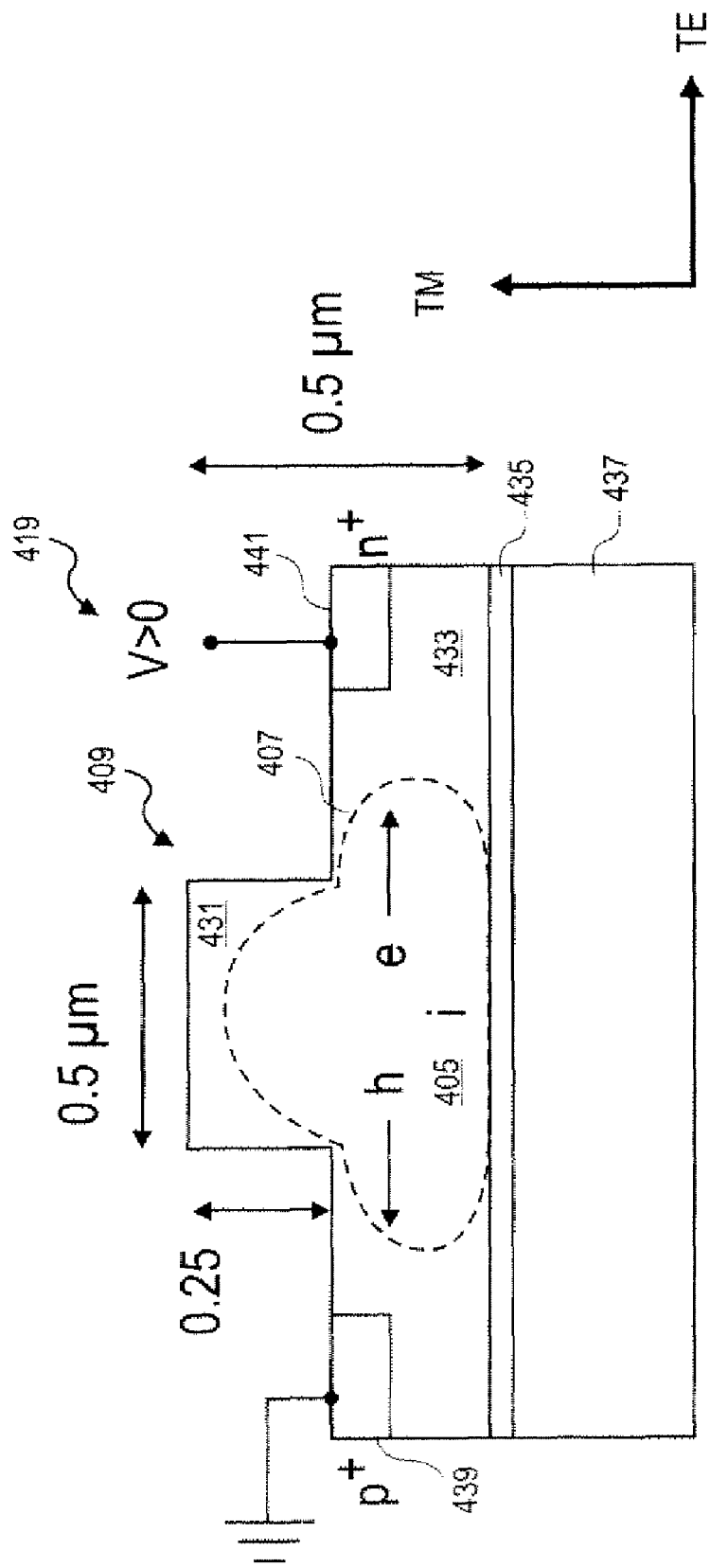
FIG. 4 is a cross section view illustration of a semiconductor-based optical waveguide including a diode structure to modulate and/or reduce two-photon absorption generated carrier lifetimes in the semiconductor waveguide in accordance with the teachings of the present invention.

FIG. 4 shows one embodiment of a cross section view illustration of an optical waveguide 409 including a semiconductor-based diode structure to modulate and/or control TPA generated carrier lifetimes and densities in the semiconductor optical waveguide 409. In one embodiment, optical waveguide 409 may for example correspond to optical waveguide 109, 209 or 309 including diode structures 117, 217 or 317 in accordance with the teachings of the present invention. In one embodiment, waveguide 409 is included in a semiconductor material layer 405 of a silicon-on-insulator (SOI) wafer. Accordingly, the SOI wafer includes an insulating layer 435 disposed between semiconductor material 405 and another semiconductor layer 437. In one embodiment, the semiconductor material 405 of the SOI wafer includes intrinsic silicon (i).

In one embodiment, optical waveguide 409 is a silicon rib waveguide including a rib region 431 and a slab region 433. In one embodiment, a p+ doped region 439 and an n+ doped region 441 are disposed on opposite lateral sides of slab region 433 outside an optical path or optical mode 407 through waveguide 409. In one embodiment, p+ doped region 439 is coupled to ground and n+ doped region 441 is coupled to receive a signal 419 or voltage (V) such that the resulting p-i-n diode structure is adapted to be selectively reverse biased in accordance with the teachings of the present invention. The reverse bias is used to vary the carrier transit time, which in turn varies the free carrier density, and Raman amplification is used to eliminate optical loss in optical waveguide 409. For instance, with an increased reverse bias, holes (h) are more attracted to be swept towards p+ doped region 439 and electrons (e) are more attracted to be swept towards n+ doped region 441, as shown in FIG. 4. In an example embodiment with an optical waveguide 409 size of approximately 1.5×1.5 µm, a significant change in the carrier lifetime is observed with the reverse bias applied with signal 419.

Figure 5:
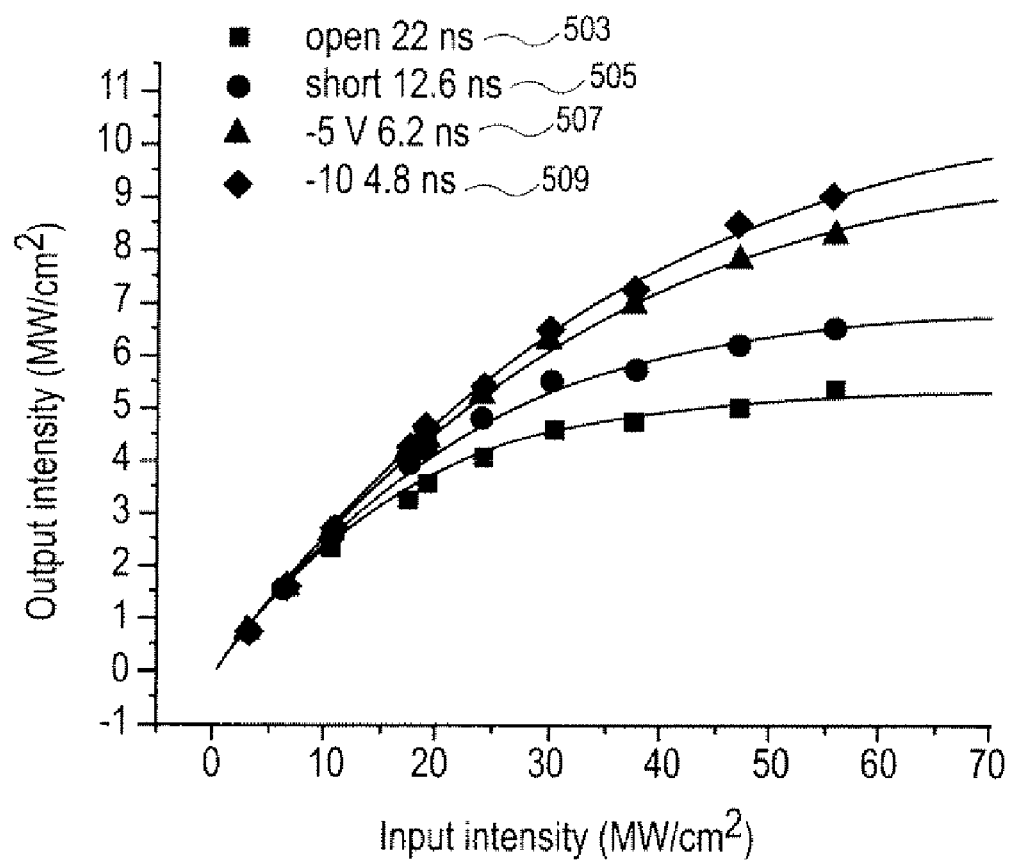
FIG. 5 is a diagram that illustrates the effects of different carrier lifetimes with respect to different voltage values applied to a diode structure included in an optical waveguide in accordance with the teachings of the present invention.

To illustrate, FIG. 5 is a diagram 501 that shows the measured and modeled output intensity of a silicon waveguide 409 as a function of input intensity in various bias conditions in accordance with the teachings of the present invention. As can be observed from FIG. 5, the carrier lifetime is long (for example 22 ns) when the p-i-n diode is in an open condition 503. As the reverse bias is increased with a short condition 505, a −5 volt condition 507 and a −10 volt condition 509, the carrier lifetime is shortened. At a bias voltage of −10 V, a carrier lifetime of 4.8 ns is obtained in accordance with the teachings of the present invention. In one embodiment, the carrier lifetime is even further reduced with an improved p-i-n structure including a smaller waveguide and a lower doping density. For example, in one embodiment, the p-i-n structure has a size of 0.5×0.5 µm, as shown in FIG. 4, and a lower doping density for the intrinsic silicon 405, of approximately $1 \times 10^{14}$ cm$^{-3}$. In one embodiment, this smaller p-i-n structure can operate at a data rate of up to 40 Gbps or more in accordance with the teachings of the present invention. Thus, the carrier lifetime and density are selectively changed in optical waveguides 109, 209, 309 or 409 according to embodiments of the present invention by controlling the reverse bias of the respective diode structures in accordance with the teachings of the present invention.

Figures 6, 7:
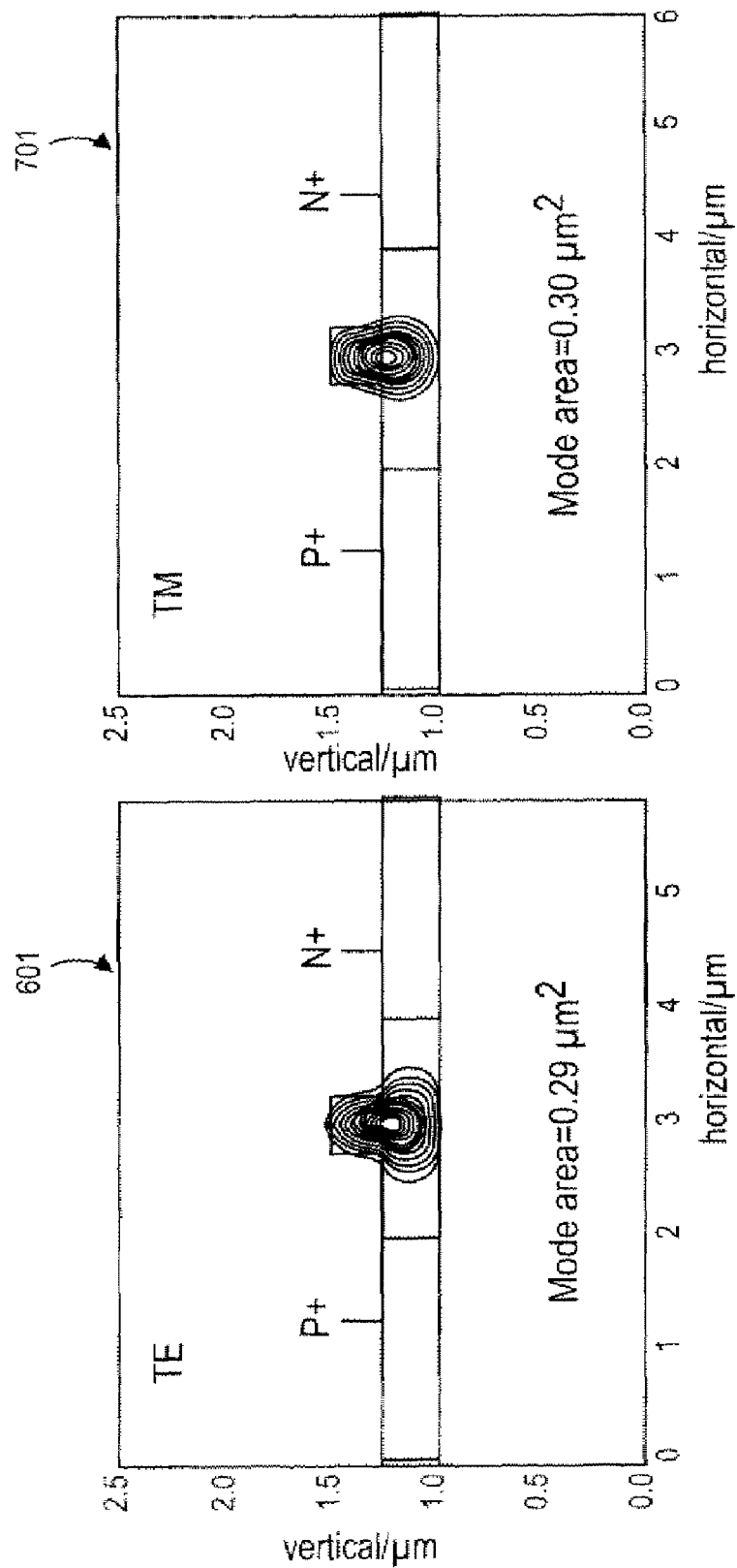
FIG. 6 is a diagram illustrating vectorial modeling of the transverse electric field (TE) mode of optical beam directed through one embodiment of an optical waveguide including a diode structure in accordance with the teachings of the present invention.
FIG. 7 is a diagram illustrating vectorial modeling of the transverse magnetic field (TM) mode of optical beam directed through one embodiment of an optical waveguide including a diode structure in accordance with the teachings of the present invention.

FIGS. 6 and 7 are diagrams illustrating vectorial modeling of the transverse electric field (TE) mode 601 and the transverse magnetic field (TM) mode 701, respectively, of an optical beam directed through an embodiment of an optical waveguide including a p-i-n diode structure in accordance with the teachings of the present invention. In the diagrams 601 and 701, a 0.5×0.5 µm waveguide is utilized with a p+ and n+ doping separation of 2 µm. As can be observed from diagrams 601 and 701, there is very little or no additional optical loss resulting from the heavily doped p+ and n+ regions because the p+ and n+ regions are substantially outside the optical modes. Indeed, the TE and TM optical modes or the optical path of an optical beam through the waveguide does not propagate through the heavily doped p+ and n+ regions, which is where increased optical loss can occur. Instead, substantially all of the optical mode is directed through the intrinsic silicon portion of the p-i-n diode structure. The small mode area of the optical beam reduces the required pump power for higher Raman gain in accordance with the teachings of the present invention. For example, in one embodiment, a 200 mW optical pump power leads to 10 dB gain in a 4.8 cm long waveguide in accordance with the teachings of the present invention.

Figure 8:
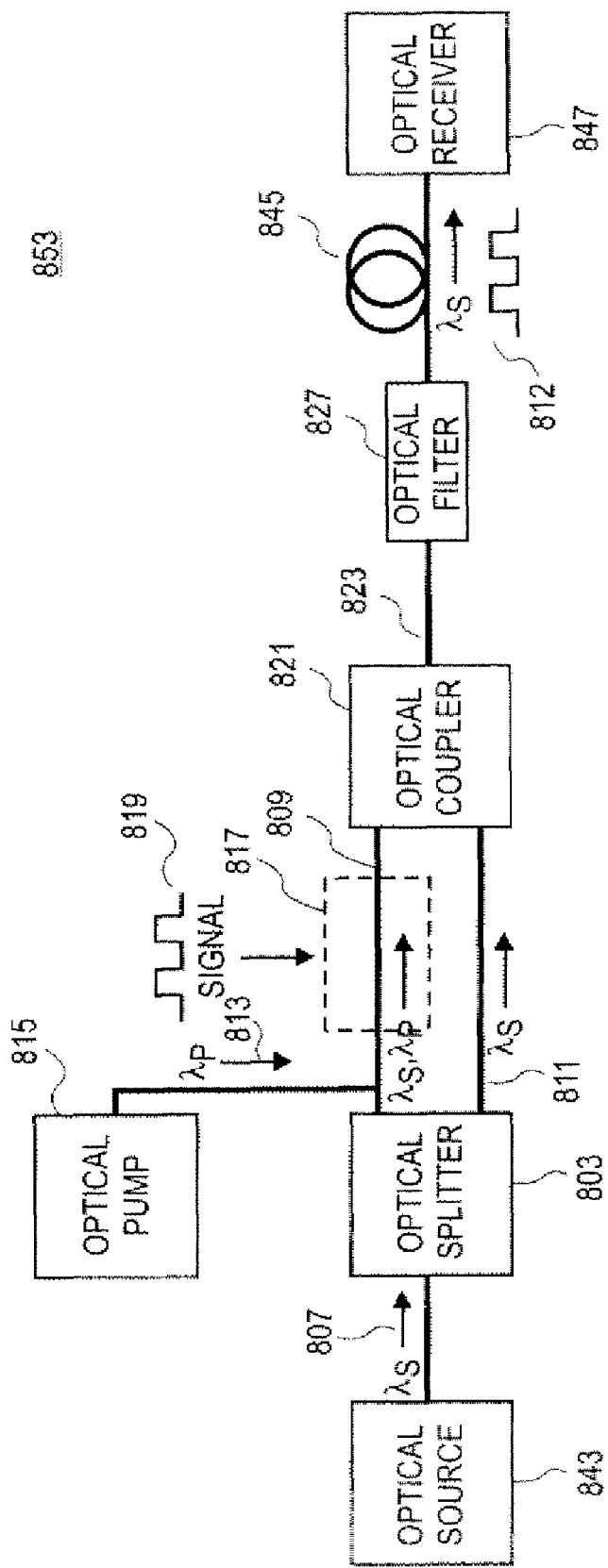
FIG. 8 is a block diagram illustration of one embodiment of a system including an embodiment of a reduced loss ultra-fast semiconductor modulator in accordance with the teachings of the present invention.

FIG. 8 is a block diagram illustration of one embodiment of system 853 showing an example application of an embodiment of a reduced loss ultra-fast semiconductor modulator in accordance with the teachings of the present invention. As shown in the depicted embodiment, system 853 includes an optical source 843 generating an optical beam 807 having a wavelength $\lambda_S$, which is received by an optical splitter 803. Optical splitter 803 splits optical beam 807 into first and second portions, which are directed from optical splitter 803 into semiconductor-based optical waveguides 809 and 811, respectively. In one embodiment, optical splitter 803 does not split optical beam 807 into equal portions such that a larger portion of optical beam 807 is directed into optical waveguide 811 than into optical waveguide 809. However, Raman amplification occurs in optical waveguide 809, which offsets the unequal distribution of the portions of optical beam 807 into optical waveguides 809 and 811 from optical splitter 803 in accordance with the teachings of the present invention. In one embodiment, the Raman gain is achieved with optical pump 815 directing a pump optical beam 813 into optical waveguide 809. The pump optical beam 813 has a pump wavelength $\lambda_P$ and a sufficient pump power level to result in SRS of the $\lambda_S$ wavelength of the portion of optical beam 807 in optical waveguide 809 in accordance with the teachings of the present invention.

In one embodiment, optical waveguide 809 includes a diode structure, which is selectively biased in response to an applied signal 819 in accordance with the teachings of the present invention. In one embodiment, the selective biasing of diode structure selectively sweeps out free carriers and controls the free carrier lifetime and/or density of the TPA generated free carriers in optical waveguide 809 resulting from the high optical pump intensity of pump optical beam 813. The selective modulation of the free carrier lifetime or density controls the refractive index modulation and optical absorption of the portion of optical beam 807 in optical waveguide 809 in accordance with the teachings of the present invention.

The first and second portions of optical beam 807 are then recombined with optical coupler 821, which in one embodiment includes a single output 823. The combined optical beam 807 is modulated in response to signal 819. In one embodiment, optical filter is optically coupled the output 823 of optical coupler 821 to filter out or block residual pump optical beam 813 having the wavelength $\lambda_P$ from optical beam 812 at output 823. In the illustrated embodiment, an optical fiber 845 is optically coupled to direct optical beam 812 from output 823 and optical filter 827 to an optical receiver 847 in accordance with the teachings of the present invention. In other embodiments, other techniques such for example optical waveguides, lenses, free space, or the like, could be employed to direct optical beam 807 from output 823 and optical filter 827 to an optical receiver 847 in accordance with the teachings of the present invention.

Figure 9:
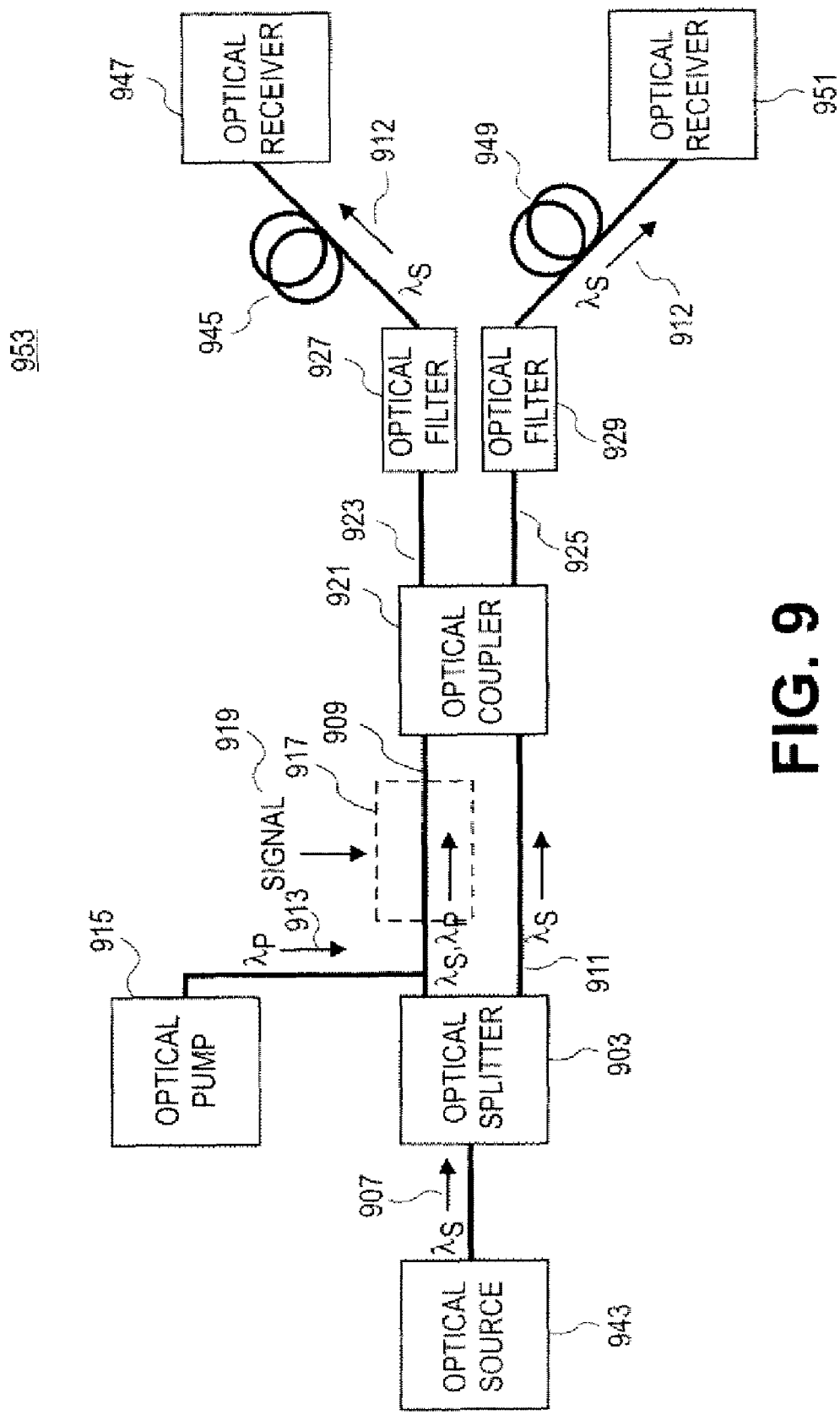
FIG. 9 is a block diagram illustration of one embodiment of a system including an embodiment of a reduced loss ultra-fast semiconductor switch in accordance with the teachings of the present invention.

FIG. 9 is a block diagram illustration of one embodiment of a system 953 showing an application of an embodiment of a reduced loss ultra-fast semiconductor switch in accordance with the teachings of the present invention. As shown, system 953 of FIG. 9 shares many similarities with system 853 of FIG. 8. One difference between system 953 and optical system 853 is that optical coupler 921 of system 953 includes a plurality of outputs 923 and 925, while optical coupler 821 of system 853 includes a single output 823. Therefore, the signal 919 applied to diode structure 917 in system 953 functions as a select signal to select which of the outputs of optical coupler 921 from which optical beam 912 is output. In addition, with more than one output 923 and 925, system 953 correspondingly includes more than one receiver 947 and 951, each of which is respectively coupled to selectively receive optical beam 912 through optical fiber 945 and optical filter 927, or optical fiber 947 and optical filter 929, respectively.

Similar to the embodiment of system 853 of FIG. 8, the embodiment of system 953 of FIG. 9 also includes an optical source 943 generating an optical beam 907 having a wavelength $\lambda_S$, which is split into unequal portions directed into optical waveguides 909 and 911, respectively. Optical pump 915 generates a pump optical beam 913 directed into optical waveguide 909. Pump optical beam 913 has a pump wavelength $\lambda_P$ and a sufficient pump power level the results in Raman amplification of the $\lambda_S$ wavelength of the portion of optical beam 907 in optical waveguide 909. The diode structure in optical waveguide 909 is selectively biased in response to signal 919 to control the free carrier lifetime or free carrier density of the TPA generated free carriers in optical waveguide 909. In the illustrated embodiment, optical coupler is a 2×2 coupler that is coupled to optical waveguides 909 and 911. Optical beam 912 is then selectively output from one of the outputs 923 or 925 in response to the signal 919 in accordance with the teachings of the present invention.

In various embodiments, system 853 and/or 953 may be included in computer systems with the optical sources, optical pumps, optical splitters, optical waveguides, optical couplers, optical filters, optical fibers and optical receivers all being included in internal components of the computer system. For example, in one embodiment, system 853 or system 953 may be a computer system, such as for example a personal or laptop computer, with optical receiver 847, or optical receivers 947 and 951, being included in for example an internal cards of the computer system, such as for example a video controller card, a network interface card, memory controller, memory or the like. The optical fibers 845, 945 and/or 947 could be used to optically couple processors or other chips or chipsets of the computer system to the optical receivers 847, 947 and/or 951. In such embodiments, optical communications are therefore provided between the processors and other system elements such as those described. In another embodiment, systems 853 or 953 may be included in a communications network with optical sources 845 and/or 943 and optical receivers 847, 947 and/or 951 being included in separate components of the communications network in accordance with the teachings of the present invention.

The above description of illustrated embodiments of the invention, including what is described in the Abstract, is not intended to be exhaustive or to be limitation to the precise forms disclosed. While specific embodiments of, and examples for, the invention are described herein for illustrative purposes, various equivalent modifications are possible, as those skilled in the relevant art will recognize. Indeed, it is appreciated that the specific wavelengths, dimensions, materials, times, voltages, power range values, etc., are provided for explanation purposes and that other values may also be employed in other embodiments in accordance with the teachings of the present invention.

These modifications can be made to embodiments of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An apparatus, comprising:
an optical splitter disposed in a semiconductor material, wherein the optical splitter splits an optical beam having a first wavelength into first and second portions;
first and second optical waveguides disposed in the semiconductor material and optically coupled to the optical splitter such that the first and second portions of the optical beam are to be directed through the first and second optical waveguides, respectively, the first optical waveguide to be optically coupled to receive a pump optical beam having a pump wavelength and a pump power level to amplify and phase shift the first portion of the optical beam of the first wavelength in the first optical waveguide;
a diode structure disposed in the first optical waveguide, the diode structure to be selectively biased to sweep out free carriers from the first optical waveguide generated in response to two photon absorption in the optical waveguide; and
an optical coupler disposed in the semiconductor material and optically coupled to the first and second optical waxeguides to combine the first and second portions of the optical beam.

2. The apparatus of claim 1 further comprising an optical filter optically coupled to an output of the optical coupler to block the pump wavelength from the output of optical coupler.

3. The apparatus of claim 1 wherein the optical coupler comprises a 3-dB waveguide coupler, the 3-dB waveguide coupler coupled to the first and second optical waveguides to combine the first and second portions of the optical beam into a modulated optical beam output from the 3-dB waveguide coupler, the modulated optical beam modulated in response to a modulation of the diode structure.

4. The apparatus of claim 1 wherein the wherein the optical coupler comprises a 2×2 coupler, the 2×2 coupler coupled to the first and second optical waveguides to combine the first and second portions of the optical beam, the 2×2 coupler having first and second outputs, the optical beam to be selectively output from either the first or the second output of the 2×2 coupler in response to a modulation of the diode structure.

5. The apparatus of claim 1 wherein the free carriers are generated in the first optical waveguide in response to two photon absorption in the first optical waveguide.

6. The apparatus of claim 1 wherein a free carrier lifetime of the free carriers in the first optical wavenode is modulated in response to a modulation of the diode structure.

7. The apparatus of claim 1 wherein refractive index modulation is induced in the first optical waveguide in response to a free carrier plasma dispersion effect in the first optical waveguide.

8. The apparatus of claim 1 wherein optical absorption is induced in the first optical waveguide in response to a free carrier plasma dispersion effect in the first optical waveguide.

9. The apparatus of claim 1 wherein the first portion of the optical beam is amplified in the first optical waveguide in response to stimulated Raman scattering of the first portion of the optical beam having the first wavelength in the first optical waveguide.

10. The apparatus of claim 1 wherein the diode structure comprises intrinsic silicon disposed between p-type silicon region and an n-type silicon region in the first optical waveguide.

11. The apparatus of claim 10 wherein an optical path of the first portion of the optical beam is directed through substantially all intrinsic silicon along the first optical waveguide.

12. The apparatus of claim 1 wherein the optical splitter has an unbalanced splitting ratio.

13. The apparatus of claim 12 wherein the first portion of the optical beam output from the optical splitter has less optical power than the second portion of the optical beam output form the optical splitter.

14. The apparatus of claim 1 wherein the semiconductor material comprises silicon.

15. A method, comprising:
splitting an optical beam having a first wavelength into first and second portions directed into first and second optical waveguides, respectively;
directing a pump optical beam having a pump wavelength into the first optical waveguide, the pump optical beam having a power level sufficient to cause further emission of the first portion of the optical beam to amplify the first portion of the optical beam, the pump optical beam further generating free carriers in the first optical waveguide in response to two photon absorption in the first optical waveguide;
selectively modulating a free carrier lifetime of the free carriers in the first optical waveguide; and
combining the first and second portions of the optical beam.

16. The method of claim 15 further comprising filter the pump wavelength from the optical beam after combining the first and second portions of the optical beam.

17. The method of claim 15 further comprising selectively modulating an optical phase of the first portion of the optical beam in the first optical waveguide by selectively modulating the free carrier lifetime of the free carriers in the first optical waveguide.

18. The method of claim 15 further comprising selectively modulating the optical beam in response to selectively modulating the free carrier lifetime of the free carriers in the first optical waveguide and combining the first and second portions of the optical beam.

19. The method of claim 15 further comprising selectively directing the optical beam from a first output or a second output of an optical coupler in response to selectively modulating the free carrier lifetime of the free carriers in the first optical waveguide and combining the first and second portions of the optical beam in the optical coupler.

20. The method of claim 15 wherein selectively modulating the free cater lifetime of the free carriers in the first optical waveguide comprises selectively reverse biasing a diode structure included in the first optical waveguide to sweep out free carriers from the first optical waveguide.

21. The method of claim 15 wherein splitting the optical beam into the first and second portions comprises splitting the optical beam into unequal portions.

22. A system, comprising:
an optical splitter disposed in a semiconductor material optically coupled to receive and split an optical beam having a first optical wavelength into first and second portions;
first and second optical waveguides disposed in the semiconductor material and coupled to the optical splitter to receive the first and second portions, respectively, the first optical waveguide optically coupled to receive a pump optical beam having a pump wavelength and having a power level sufficient to cause further emission of the first portion of the optical beam to amplify the first portion of the optical beam in the first optical waveguide, the pump optical beam further generating free carriers in the first optical waveguide in response to two photon absorption in the first optical waveguide;
a diode structure disposed in the first optical waveguide, the diode structure to be selectively biased to modulate a free carrier lifetime of the free carriers in the first optical waveguide;
an optical coupler disposed in the semiconductor material and optically coupled to the first and second optical waveguides to combine the first and second portions of the optical beam;
a first optical receiver optically coupled to the optical coupler to receive the optical coupler to receive the optical beam; and
a first optical fiber optically coupled between the optical coupler and the optical receiver.

23. The system of claim 22 further comprising an optical filter optically coupled to the first optical fiber between the optical coupler and the first optical receiver to filter the pump wavelength from the optical beam.

24. The system of claim 22 wherein the optical coupler includes one output optically coupled to the first optical fiber, wherein the optical beam is selectively modulated in response to the selective biasing of the diode structure such that a modulated optical beam is directed from the output of the optical coupler to the first optical fiber.

25. The system of claim 24 wherein the optical coupler comprises a 3-dB waveguide coupler disposed in the semiconductor material.

26. The system of claim 22 further comprising:
a second optical receiver optically coupled to the optical coupler to receive the to receive the optical beam; and
a second optical fiber optically coupled between the optical coupler and the optical receiver such that the optical beam is selectively directed to the first or second optical receiver through the first or second optical fibers, respectively, in response to the select biasing of the diode structure.

27. The system of claim 26 wherein the optical coupler comprises a 2×2 optical coupler.

28. The system of claim 22 wherein the diode structure comprises a p-i-n diode structure disposed in the semiconductor material.

29. The system of claim 28 wherein the first optical waveguide is directed through an intrinsic silicon region of the p-i-n diode structure.

30. The system of claim 22 wherein the first portion of the optical beam is amplified in the first optical waveguide in response to stimulated Raman scattering of the first portion of the optical beam having the first wavelength in the first optical waveguide.

* * * * *